US012275915B2

(12) United States Patent
Nakamura et al.

(10) Patent No.: US 12,275,915 B2
(45) Date of Patent: Apr. 15, 2025

(54) FRAGRANCE COMPOSITION

(71) Applicant: KAO CORPORATION, Tokyo (JP)

(72) Inventors: Saki Nakamura, Wakayama (JP); Yuya Kitagawa, Tokyo (JP); Takako Igarashi, Wakayama (JP); Ryuuya Arata, Wakayama (JP); Yusuke Yamane, Wakayama (JP); Shusuke Matsui, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 18/572,401

(22) PCT Filed: Jun. 22, 2022

(86) PCT No.: PCT/JP2022/024847
§ 371 (c)(1),
(2) Date: Dec. 20, 2023

(87) PCT Pub. No.: WO2022/270532
PCT Pub. Date: Dec. 29, 2022

(65) Prior Publication Data

US 2024/0294844 A1 Sep. 5, 2024

(30) Foreign Application Priority Data

Jun. 22, 2021 (JP) ................................ 2021-103533

(51) Int. Cl.
*C11B 9/00* (2006.01)

(52) U.S. Cl.
CPC .......... *C11B 9/0011* (2013.01); *C11B 9/0061* (2013.01)

(58) Field of Classification Search
CPC .. C11B 9/0061; C11B 9/0011; D06M 13/256; D06M 13/005
See application file for complete search history.

(56) References Cited

U.S. PATENT DOCUMENTS

| | | | | |
|---|---|---|---|---|
| 5,419,842 A * | 5/1995 | Crutzen | C11D 3/0015 510/526 |
| 2007/0214999 A1 | 9/2007 | Meyer et al. | |
| 2023/0035236 A1 | 2/2023 | Igarashi et al. | |

FOREIGN PATENT DOCUMENTS

| | | | | |
|---|---|---|---|---|
| JP | H09-505565 A | 6/1997 | |
| JP | 2008517051 A | 5/2008 | |
| JP | 2009261929 A | 11/2009 | |
| JP | 2012233042 A | 11/2012 | |
| JP | 2012254177 A | 12/2012 | |
| JP | 2020084054 A | 6/2020 | |
| WO | WO-9512379 A1 | 5/1995 | |
| WO | WO-9807809 A2 * | 2/1998 | A61K 8/19 |
| WO | WO-9847995 A1 * | 10/1998 | C11D 3/507 |
| WO | WO-2006043177 A1 | 4/2006 | |
| WO | WO-2015008787 A1 | 1/2015 | |
| WO | WO-2021125326 A1 | 6/2021 | |

OTHER PUBLICATIONS

English translation of the International Preliminary Report on Patentability issued Jan. 4, 2024 in PCT/JP2022/024847, 5 pages.
A. Leo, "Comprehensive Medicinal Chemistry", vol. 4, Pergamon Press, 1990, 29 pages.
International Search Report issued Aug. 30, 2022 in PCT/JP2022/024847 (with English translation), 4 pages.

* cited by examiner

*Primary Examiner* — Vishal V Vasisth
(74) *Attorney, Agent, or Firm* — Element IP, PLC

(57) ABSTRACT

The present invention is a fragrance composition containing, (A) a fragrance compound, and (B) a compound represented by the following formula 1, Formula 1

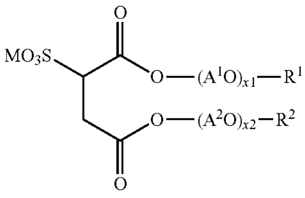

wherein $R^1$ and $R^2$ each represent a hydrocarbon group, $R^1$ and $R^2$ having 17 or more carbons in total, $A^1O$ and $A^2O$ each represent an alkyleneoxy group with 2 or more and 4 or less carbons, with $A^1$ and $A^2$ being alkylene groups, x1 and x2 represent average numbers of added moles of $A^1O$ and $A^2O$, respectively, and each represent a number of 0 or more and 10 or less, and M is a cation.

20 Claims, No Drawings

FRAGRANCE COMPOSITION

This application is a 371 of PCT/JP2022/024847, filed Jun. 22, 2022.

FIELD OF THE INVENTION

The present invention relates to a fragrance composition and a method for imparting a scent.

BACKGROUND OF THE INVENTION

Fragrances are used for various products of daily use for the purpose of producing a feeling of luxuriousness, a feeling of security, a feeling of expecting effectiveness or the like. A characteristic scent gives a product identification effect and customer attracting power. In general, imparting a scent to products is performed by using a fragrance composition obtained by mixing multiple fragrance materials to control a balance or retainability of scents or the like.

Fragrances are often used also in detergents, softening agents or the like for treating textile products such as clothing or the like for the purpose of imparting a scent to textile products after treatment.

For example, JP-A 2008-517051 describes an oil-containing composition containing an oil, a predetermined surfactant system, a predetermined solubilizing-aid ingredient and water under predetermined conditions, and cites a perfume as the oil.

Further, JP-A 2009-261929 describes an air refreshing liquid containing a fragrance and a surfactant, wherein the air refreshing liquid contains the surfactant at a ratio of 0.4 to 1 part by weight per weight of the fragrance and is transparent.

SUMMARY OF THE INVENTION

The present invention provides a fragrance composition and a method for imparting a scent excellent in scent retaining performance on an object.

The present invention relates to a fragrance composition containing, (A) a fragrance compound [hereinafter referred to as component (A)], and (B) a compound represented by the following formula 1 [hereinafter referred to as component (B)], Formula 1

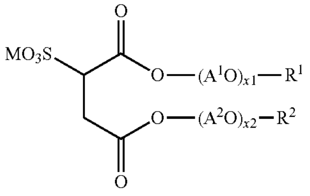

wherein $R^1$ and $R^2$ each represent a hydrocarbon group, $R^1$ and $R^2$ having 17 or more carbons in total, $A^1O$ and $A^2O$ each represent an alkyleneoxy group with 2 or more and 4 or less carbons, with $A^1$ and $A^2$ being alkylene groups, x1 and x2 represent average numbers of added moles of $A^1O$ and $A^2O$, respectively, and each represent a number of 0 or more and 10 or less, and M is a cation.

Further, the present invention relates to a method for imparting a scent including, treating an object with the fragrance composition of the present invention.

According to the present invention, provided are a fragrance composition and a method for imparting a scent excellent in scent retaining performance on an object.

EMBODIMENTS OF THE INVENTION

[Fragrance Composition]

Component (A) is a fragrance compound.

Component (A) has a Log P of preferably 1 or more, more preferably 2 or more and further preferably 3 or more, and preferably 7 or less, more preferably 5 or less and further preferably 4 or less from the viewpoints of dispersion stability and scent retaining performance.

Here, Log P is a logarithm value of a 1-octanol/water partition coefficient of a compound, which means a ratio of equilibrium concentrations of a solute in 1-octanol and water in partition equilibrium when the compound is dissolved as a solute in a two liquid phase system formed of those solvents, and is generally expressed in the form of logarithm "log P" relative to base 10. In other words, a log P value is an indicator of lipophilicity (hydrophobicity), and a compound with a larger log P value is more hydrophobic and a compound with a smaller log P value is more hydrophilic.

For Log P, for example, database available from Daylight Chemical Information Systems, Inc. (Daylight CIS) or the like on which Log P values of many compounds are listed can be referred to. Further, when a measured value of Log P is not available, it can be calculated by the program "C LOG P" (Daylight CIS) or the like, and among others, calculating by the program "C LOG P" is highly reliable and suitable.

The program "C LOG P" outputs a value of "calculated Log P (sometimes also referred to as C Log P)" calculated by Hansch and Leo's fragment approach together with a measured value of Log P if any. The fragment approach is based on a chemical structure of a compound and considers an atomic number and a chemical bond type (A. Leo, Comprehensive Medicinal Chemistry, Vol. 4, C. Hansch, P. G. Sammens, J. B. Taylor and C. A. Ramsden, Eds., p. 295, Pergamon Press, 1990). This C Log P value is one of the most common and reliable estimated values at present, and when no measured value of Log P is available at the time of selection of a compound, it is suitable to use a C Log P value instead. In the present invention, either a measured value of Log P or a C Log P calculated by the program "C LOG P" may be used as a Log P of component (A).

Component (A) is preferably one or more of hydrocarbons, alcohols, phenols, aldehydes, ketones, acetals, ethers, esters, carbonates, lactones, oximes, nitriles, Schiff bases, amides, a nitrogen-containing compound, a sulfur-containing compound, a natural essential oil and a natural extract.

In the present invention, each fragrance compound in a plural form means a single compound or a mixture of two or more compounds.

Examples of the hydrocarbons include limonene, α-pinene, β-pinene, terpinene, p-cymene, cedrene, longifolene, valencene, camphene, myrcene or the like.

Examples of the alcohols include an aliphatic alcohol, a terpene-based alcohol, an aromatic alcohol or the like.

Examples of the aliphatic alcohol include prenol, trans-2-hexenol, cis-3-hexenol, 2,6-dimethylheptanol, 1-octen-3-ol, 2,6-nonadienol, 3,6-nonadieol, 4-methyl-3-decen-5-ol (Undecavertol, trade name by Givaudan S.A.), 2,4-dimethyl-3-cyclohexene-1-methanol, isocyclogeraniol, o-tert-butylcyclohexanol, p-tert-butylcyclohexanol, 4-(1-methylethyl)-cyclohexanemethanol (MAYOL, trade name by Firmenich S.A.), 1-(2-tert-butylcyclohexyl)-2-butanol (AM- BER CORE, trade name by Kao Corporation), 1-(2,2,6-trimethylcyclohexyl) hexan-3-ol (Timberol, trade name by Symrise AG), 2-methyl-4-(2,2,3-trimethyl-3-cyclopenten-1-yl)-2-buten-1-ol (SANDALMYSORE CORE, trade name by Kao Corporation), 2-ethyl-4-(2,2,3-trimethyl-3-cyclopenten-1-yl)-2-buten-1-ol (BACDANOL, trade name by INTERNATIONAL FLAVORS & FRAGRANCES INC.), 4-methyl-2-(2-methylpropyl)tetrahydro-2H-4-pyranol (Florosa, trade name by Givaudan S.A.), MAGNOL [trade name by Kao Corporation for isomer mixture containing (4-ethyl-bicyclo[2.2.1]hept-2-yl)cyclohexanol and (2-ethyl-bicyclo [2.2.1]hept-7-yl)cyclohexanol or the like] and others. Note that a trade name shown in parenthesis after a name of a fragrance compound is shown as an example (the same applies hereinafter).

Examples of the terpene-based alcohol include citronellol, hydroxycitronellol, linalool, dihydrolinalool, tetrahydrolinalool, ethyl linalool, geraniol, nerol, tetrahydrogeraniol, myrcenol, dihydromyrcenol, tetrahydromyrcenol, ocimenol, terpineol, menthol, borneol, fenchyl alcohol, farnesol, nerolidol, cedrol or the like.

Examples of the aromatic alcohol include benzyl alcohol, styralyl alcohol, phenethyl alcohol, cumin alcohol, dimethyl phenyl ethyl carbinol, cinnamic alcohol, 3-methyl-5-phenylpentanol, 4-phenylpentanol (PAMPLEFLEUR, trade name by INTERNATIONAL FLAVORS & FRAGRANCES INC.), 2,2-dimethyl-3-(3-methylphenyl) propanol (Majantol, trade name by Symrise AG) or the like. Among these, phenethyl alcohol is preferable from the viewpoints of dispersion stability and scent retaining performance.

Examples of the phenols include anethole, guaiacol, eugenol, isoeugenol or the like. Among these, eugenol is preferable from the viewpoints of dispersion stability and scent retaining performance.

Examples of the aldehydes include an aliphatic aldehyde, a terpene-based aldehyde, an aromatic aldehyde or the like as with the above alcohols, and aldehydes obtained by converting only the functional groups of the alcohols as the fragrance compound are all included in examples of the fragrance compound.

Examples of other aldehydes include hexanal (ALDEHYDE C-6, trade name by Kao Corporation), octanal (ALDEHYDE C-8, trade name by Kao Corporation), nonanal (ALDEHYDE C-9, trade name by Kao Corporation), decanal (ALDEHYDE C-10, trade name by Kao Corporation), undecanal (ALDEHYDE C-11 UNDECYL, trade name by Kao Corporation), 10-undecenal (ALDEHYDE C-111 LEN, trade name by Kao Corporation), 2-methyldecanal, dodecanal (ALDEHYDE C-12 LAURYL, trade name by Kao Corporation), 2-methylundecanal (ALDEHYDE C-12 MNA, trade name by Kao Corporation), cis-4-decenal, trans-4-decenal, 4,8-dimethyldeca-4,9-dienal (FLORAL SUPER, trade name by INTERNATIONAL FLAVORS & FRAGRANCES INC.), 2-cyclohexylpropanal (POLLENAL II, trade name by Kao Corporation), 4(3)-(4-methyl-3-penten-1-yl)-3-cyclohexene-1-carboxaldehyde (MYRAC ALDEHYDE, trade name by INTERNATIONAL FLAVORS & FRAGRANCES INC.), 4 (3)-(4-hydroxy-4-methylpentyl)-3-cyclohexene-1-carboxaldehyde (LYRAL, trade name by INTERNATIONAL FLAVORS & FRAGRANCES INC.), trimethylcyclohexene methylbutanal (Cetonal, trade name by Givaudan S.A.), 1-methyl-4-(4-methylpentyl)-3-cyclohexenecarboxaldehyde (Vernaldehyde, trade name by Givaudan S.A.), octahydro-4,7-methanoindene carboxaldehyde (MELOZONE, trade name by INTERNATIONAL FLAVORS & FRAGRANCES INC.), methoxy dicyclopentadiene carboxaldehyde (SCENTENAL, trade name by Firmenich S.A.), 4-tricyclodecylidenebutanal (Dupical, trade name by Givaudan S.A.), 3,7-dimethyl-2-methylene-6-octenal (BERGAMAL, trade name by INTERNATIONAL FLAVORS & FRAGRANCES INC.), campholene aldehyde, 3-(4-tert-butylphenyl) propanal (Bourgeonal, trade name by Givaudan S.A.), 3-(4-isopropylphenyl)-2-methylpropionaldehyde (Cyclamen Aldehyde, trade name by Givaudan S.A.), 3-(4-ethylphenyl)-2,2-dimethylpropionaldehyde (FLORALOZONE, trade name by INTERNATIONAL FLAVORS & FRAGRANCES INC.), 3-(4-isobutylphenyl)-2-methylpropionaldehyde (Suzaral, trade name by Takasago International Corporation), 3-(4-t-butylphenyl)-2-methylpropionaldehyde (Lilial, trade name by Givaudan S.A.), amyl cinnamaldehyde (AMYL CINNAMIC ALDEHYDE, trade name by Kao Corporation), hexyl cinnamaldehyde (HEXYL CINNAMIC ALDEHYDE, trade name by Kao Corporation; α-Hexylcinnamaldehyde, trade name by FUJIFILM Wako Pure Chemical Corporation), 2-methyl-3-(4-methoxyphenyl) propanal (CANTHOXAL, trade name by INTERNATIONAL FLAVORS & FRAGRANCES INC.), vanillin, ethyl vanillin, 3,4-methylenedioxybenzaldehyde (Heliotropin, trade name by Takasago International Corporation), α-methyl-1,3-benzodioxol-5-propanal (HELIONAL, trade name by INTERNATIONAL FLAVORS & FRAGRANCES INC.), 2,4-dimethyl-3-cyclohexane-1-carboxaldehyde (TRIPLAL, trade name by INTERNATIONAL FLAVORS & FRAGRANCES INC.), 2,6-nonadienal or the like. Among these, hexyl cinnamaldehyde is preferable from the viewpoints of dispersion stability and scent retaining performance.

Examples of the ketones include methylheptenone, dimethyloctenone, 3-octanone, hexylcyclopentanone, o-tert-butylcyclohexanone, dihydrojasmone, 2,2,5-trimethyl-5-pentylcyclopentanone (VELOUTONE, trade name by Firmenich S.A.), 2-(2-(4-methyl-3-cyclohexen-1-yl) propyl) cyclopentanone (Nectaryl, trade name by Givaudan S.A.), ionones, methyl ionone, γ-methyl ionone, damascones, β-damascone, δ-damascone, 1-(2,4,4-trimethyl-2-cyclohexyl)-trans-2-butanone (Isodamascon, trade name by Symrise AG), damascenones, 1-(5,5-dimethyl-1-cyclohexen-1-yl)-4-penten-1-one (DYNASCONE, trade name by Firmenich S.A.), 4-methyl-4-phenyl-2-pentanone (Vetikon, trade name by Symrise AG), irone, 1,2,3,5,6,7-hexahydro-1,1,2,3,3-pentamethyl-4H-inden-4-one (CASHMERAN, trade name by INTERNATIONAL FLAVORS & FRAGRANCES INC.), 1-(1,2,3,4,5,6,7,8-octahydro-2,3,8,8-tetramethyl-2-naphthalenyl)-ethan-1-one (ISO E SUPER, trade name by INTERNATIONAL FLAVORS & FRAGRANCES INC.), 7-methyl-3,5-dihydro-2H-benzodioxepin-3-one (CALONE, trade name by Firmenich S.A.), carvone, menthone, acetyl cedrene, isolongifolanone, nootkatone, benzylacetone, raspberry ketone, benzophenone, 6-acetyl-1,1,2,4,4,7-hexamethyl tetrahydronaphthalene (Tonalid, trade name by PFW Aroma Chemicals B.V.), β-methyl naphthyl ketone, ethyl maltol, camphor, muscone, 3-methyl-5-cyclopentadecen-1-one (MUSCENONE, a product of Firmenich S.A.), civetone, 8-cyclohexadecenone (Globanone, trade name by Symrise AG) or the like.

Examples of the acetals include 4-isopropyl-5,5-dimethyl-1,3-dioxane, ethoxymethyl cyclododecyl ether (BOISAMBRENE FORTE, trade name by Kao Corporation), 5-methyl-5-propyl-2-(1-methyl-butyl)-1,3-dioxane (TROENAN, trade name by Kao Corporation), 1,1-dimethoxy-2,2,5-trimethyl-4-hexene (Methyl Pamplemousse, trade name by Givaudan S.A.), phenylacetaldehyde dimethyl acetal, acetaldehyde ethyl linalyl acetal, citral dimethyl acetal, hydratropaldehyde dimethyl acetal, 2,2,5,5-tetramethyl-4-isopropyl-1,3-dioxane, 2,4,6-trimethyl-2-phenyl-1,3-dioxane (Floropal, trade name by Symrise AG) or the like.

Examples of the ethers include 3,3,5-trimethylcyclohexyl ethyl ether (HERBAVERT, trade name by Kao Corporation), cedryl methyl ether, ambroxide, dodecahydro-3a,6,6,9a-tetramethyl naphto[2,1-b]furan (AMBROTECH, trade name by Kao Corporation), methyl isoeugenol, citronellyl ethyl ether, geranyl ethyl ether, 1,8-cineole, rose oxide, dihydro rose oxide, linalool oxide, estragole, anethole, hinokitiol, diphenyl oxide, β-naphthol methyl ether, β-naphthol ethyl ether, 1,3,4,6,7,8-hexahydro-4,6,6,7,8,8-hexamethylcyclopenta-γ-2-benzopyran (GALAXOLIDE, trade name by INTERNATIONAL FLAVORS & FRAGRANCES INC.) or the like. Among these, estragole is preferable from the viewpoints of dispersion stability and scent retaining performance.

Examples of the esters used as a fragrance material include an aliphatic carboxylic acid ester, an aromatic carboxylic acid ester and other carboxylic acid esters.

While examples of an aliphatic carboxylic acid that forms the aliphatic carboxylic acid ester include a straight-chain or branched-chain carboxylic acid with 1 to 18 carbons, an important one of all is a carboxylic acid with 1 to 6 carbons such as formic acid, acetic acid, glycolic acid, propionic acid, butyric acid or the like, especially acetic acid. Examples of an aromatic carboxylic acid that forms the aromatic carboxylic acid ester include benzoic acid, anisic acid, phenylacetic acid, cinnamic acid, salicylic acid, phenyl glycidic acids, anthranilic acids or the like. Examples of an alcohol that forms the aliphatic and aromatic esters include straight-chain and branched-chain aliphatic alcohols with 1 to 5 carbons and the above alcohols as the fragrance compound.

Examples of the other carboxylic acid esters include ethyl dihydrocyclo geranate (Ethyl Safranate, trade name by Givaudan S.A.), ethyl 2-cyclohexylpropionate, ethyl tricyclo[5.2.1.$0^{2,6}$]decan-2-yl-carboxylate (FRUITATE, trade name by Kao Corporation), methyl jasmonate, methyl dihydrojasmonate (MDJ, trade name by Kao Corporation), tricyclodecenyl propionate or the like.

Examples of the carbonates include cis-3-hexenyl methyl carbonate (LIFFAROME, trade name by INTERNATIONAL FLAVORS & FRAGRANCES INC.), methyl cyclooctyl carbonate (JASMACYCLAT, trade name by Kao Corporation), ethyl-2-tert-butylcyclohexyl carbonate (FLORAMAT, trade name by Kao Corporation) or the like.

Examples of the lactones include γ-nonalactone, γ-decalactone, δ-decalactone, tetrahydro-6-(3-hexenyl)-2H-pyran-2-one (JASMOLACTONE, trade name by Firmenich S.A.), γ-undecalactone, coumarin, octahydrocoumarin, 6-ethylideneoctahydro-5,8-methano-2H-1-benzopyran-2-one (FLOREX, trade name by Firmenich S.A.), cyclopentadecanolide, 12(11)-oxacyclohexadecen-2-one (HABANOLIDE, trade name by Firmenich S.A.), 10-octacycloheptadecen-2-one (AMBRETTOLIDE, trade name by INTERNATIONAL FLAVORS & FRAGRANCES INC.), ethylene brassylate or the like.

Examples of the oximes include 1,5-dimethyl-bicyclo[3,2,1]octan-8-one oxime (Buccoxime, trade name by Symrise AG), 2,4,4,7-tetramethyl-6,8-nonadiene-3-one oxime (Labienoxime, trade name by Givaudan S.A.), 5-methyl-3-heptanone oxime or the like.

Examples of the nitriles include dodecanenitrile, citronellyl nitrile, cuminyl nitrile, cinnamyl nitrile, 2-cyclohexylidene-2-phenylacetonitrile (Peonile, trade name by Givaudan S.A.) or the like.

Examples of the Schiff bases include methyl-N-(3,7-dimethyl-7-hydroxyoctylidene)-anthranilate (Aurantiol, trade name by Givaudan S.A.), methyl-3,5-dimethyl-3-cyclohexen-1-yl-methylene anthranilate (Ligantraal, trade name by Givaudan S.A.), methyl 2-[(2-methylundecylidene) amino] benzoate or the like.

Examples of the amides include N, 2-dimethyl-N-phenylbutylamide (Gardamide, trade name by Givaudan S.A.), 2-ethyl-N-methyl-N-(3-methylphenyl) butanamide (Paradisamide, trade name by Givaudan S.A.) or the like.

Besides the above, examples of the nitrogen-containing compound include pyrroles, indoles, thiazoles or the like.

Examples of the sulfur-containing compound include thiols, sulfides, thiophenes, thiocarboxylic acids, cyclic thioethers or the like.

Examples of the natural essential oil and the natural extract include orange, lemon, lime, bergamot, petitgrain, neroli, vanilla, mandarin, peppermint, spearmint, lavender, lavandin, chamomile, rosemary, eucalyptus, sage, basil, rose, rockrose, geranium, jasmine, ylang-ylang, anise, clove, ginger, nutmeg, cardamom, cedar-wood, cypress, vetiver, guaiac wood, patchouli, lemongrass, labdanum, galbanum, olibanum, gurjun balsam or the like.

Component (B) is a compound represented by the above formula (1). The reason why scent retaining performance is improved by using component (B) in combination with component (A) is uncertain, but the present inventors infer it as follows. The fragrance composition of the present invention is usually applied to an object such as fibers or the like in the presence of water, for example, by being formulated in a treatment liquid containing water. When components (A) and (B) coexist in water, component (B) forms a vesicle of a structure in which component (A) is solubilized. This vesicle suppresses volatilization of component (A) volatilizable together with moisture by adsorbing to an object and promoting dewatering. Further, the presence of component (A) in the vesicle also contributes to suppressed volatilization of component (A). In other words, component (B) is considered to be excellent in the effect of delivering component (A) to an object in water. It is considered that these suppress volatilization of component (A), thus improving scent retaining performance. Note that the acting mechanism of the present invention is not limited thereto.

$R^1$ and $R^2$ in the formula 1 may be the same or different, and each represent a hydrocarbon group. Examples of the hydrocarbon group include an alkyl group or an alkenyl group.

The hydrocarbon groups of $R^1$ and $R^2$ in the formula 1 each have preferably 6 or more, more preferably 8 or more, further preferably 9 or more and furthermore preferably 10 or more carbons from the viewpoint of scent retaining performance, and preferably 24 or less, more preferably 20 or less, further preferably 17 or less and furthermore preferably 12 or less carbons from the viewpoint of dispersibility in water.

A total carbon number of $R^1$ and $R^2$ in the formula 1 is 17 or more, preferably 18 or more and more preferably 20 or more from the viewpoint of scent retaining performance, and preferably 30 or less, more preferably 28 or less, further preferably 26 or less, furthermore preferably 24 or less and furthermore preferably 22 or less from the same viewpoint. Here, when the fragrance composition of the present invention contains two or more compounds of different total carbon numbers of $R^1$ and $R^2$ as component (B), a total carbon number of $R^1$ and $R^2$ in the fragrance composition represents a molar average of total carbon numbers of $R^1$ and $R^2$ of those compounds.

The hydrocarbon groups of $R^1$ and $R^2$ in the formula 1 may each be either a straight chain or a branched chain, but preferably include a branched chain from the viewpoint of dispersibility in water. When the hydrocarbon groups of $R^1$ and $R^2$ are branched chains, $R^1$ and $R^2$ each preferably have a side chain with 2 or more carbons and more preferably have a side chain with 3 or more carbons from the viewpoint of scent retaining performance. The side chains may each have 10 or less, further 8 or less, further 6 or less and further 4 or less carbons. In other words, from the viewpoint of scent retaining performance, $R^1$ and $R^2$ each represent preferably a branched-chain hydrocarbon group having a main chain and a side chain, the side chain having 2 or more and further 3 or more, and 10 or less, 8 or less, further 6 or less and further 4 or less carbons. From the viewpoint of scent retaining performance, $R^1$ and $R^2$ each represent more preferably a branched-chain hydrocarbon group having a main chain and a side chain, the side chain having 3 or 4 carbons. Note that, in each of the hydrocarbon groups of $R^1$ and $R^2$, when the longest series of carbons with carbon bonded to an oxygen atom (O) in the formula taken as the first carbon is referred to as a main chain and a carbon number of the main chain is represented as X (for example, X is 3 or more when $R^1$ and $R^2$ each have 6 or more carbons), a hydrocarbon group bonded to any carbon of the first to the X−1 of the main chain is referred to as a side chain.

The hydrocarbon groups of $R^1$ and $R^2$ in the formula 1 may each be either saturated or unsaturated, but preferably include an unsaturated hydrocarbon group when they are straight chains from the viewpoint of dispersibility in water.

Therefore, at least one of $R^1$ and $R^2$ in the formula 1 is preferably a hydrocarbon group having a branch structure or an unsaturated bond.

The hydrocarbon groups of $R^1$ and $R^2$ in the formula 1 each more preferably include a saturated branched-chain hydrocarbon group or an unsaturated straight-chain hydrocarbon group from the viewpoint of scent retaining performance.

Further, when the hydrocarbon groups of $R^1$ and $R^2$ are branched-chain hydrocarbon groups, they may each be a group derived from a Guerbet alcohol from the viewpoints of scent retaining performance and availability.

Further, when the hydrocarbon groups of $R^1$ and $R^2$ are branched-chain hydrocarbon groups with 10 carbons, they may each be a group derived from a branched alcohol with 10 carbons such as isodecanol (for example, decyl alcohol manufactured by KH Neochem Co., Ltd.) or the like from the viewpoints of scent retaining performance and availability.

Component (B) is preferably a compound of the formula 1 in which $R^1$ and $R^2$ each represent a branched-chain alkyl group with 10 or more and 12 or less carbons and further a branched-chain alkyl group with 10 carbons.

In the present invention, a hydrocarbon residue left after the removal of a hydroxyl group from a secondary alcohol is included in an open-chain branched hydrocarbon group such as a branched-chain alkyl group or the like.

When $R^1$ and $R^2$ each represent a branched-chain alkyl group with 10 or more and 12 or less carbons, total numbers of carbons constituting the side chains may be the same or different, and are preferably 1 or more and more preferably 2 or more, and preferably 4 or less, more preferably 3 or less and further preferably 3 from the viewpoint of scent retaining performance.

In the present invention, a total number of carbons constituting a side chain is a total of carbon numbers of all side chains other than a main chain in one branched-chain alkyl group, and when there are multiple side chains, it is a total of carbon numbers of all those side chains.

$R^1$ and $R^2$ may have the same or different numbers of side chains, and each have 1 or more, and preferably 3 or less and more preferably 2 or less side chains from the viewpoint of scent retaining performance. $R^1$ and $R^2$ each preferably have one side chain from the viewpoint of scent retaining performance.

In the present invention, a number of side chains is a number of side chains branching off from a main chain, and even if a side chain further has a side chain branching off from the side chain, the number of side chains remains the same. However, while a side chain may further have a side chain branching off from the side chain, the side chain is preferably a straight chain from the viewpoint of scent retaining performance.

When $R^1$ and $R^2$ each independently represent a branched-chain alkyl group with 10 or more and 12 or less carbons, $R^1$ and $R^2$ may have the same or different numbers of branch carbons and each have 1 or more, and preferably 3 or less and furthermore preferably 2 or less branch carbons from the viewpoint of scent retaining performance. $R^1$ and $R^2$ each preferably have one branch carbon from the viewpoint of scent retaining performance. In the present invention, a number of branch carbons is a total of numbers of tertiary carbon atoms and quaternary carbon atoms in a branched-chain alkyl group.

From the viewpoint of scent retaining performance, more preferable aspects of $R^1$ and $R^2$ are each a branched-chain alkyl group with 10 or more and 12 or less carbons, wherein the branched-chain alkyl groups each independently have a main chain with 7 or 8 carbons, each have preferably 1 or more and 4 or less, more preferably 2 or more and 4 or less, further preferably 2 or more and 3 or less and furthermore preferably 3 carbons constituting a side chain, and each have preferably 3 or less, more preferably 2 or less and further preferably 1 side chain.

$R^1$ and $R^2$ each represent preferably a branched-chain alkyl group selected from a branched-chain decyl group and a branched-chain dodecyl group and more preferably a branched-chain decyl group from the viewpoint of scent retaining performance. Examples of the branched-chain decyl group include 2-propylheptyl group, a group derived from a decyl alcohol manufactured by KH Neochem Co., Ltd. or the like, and 2-propylheptyl group is preferable. Examples of the branched-chain dodecyl group include 2-butyloctyl group or the like.

The hydrocarbon groups of $R^1$ and $R^2$ in the formula 1 may be the same or different. The case where the hydrocarbon groups of $R^1$ and $R^2$ are different is preferable from the viewpoint of dispersibility in water. Further, the case where the hydrocarbon groups of $R^1$ and $R^2$ are the same is preferable from the viewpoint of scent retaining performance. For example, $R^1$ and $R^2$ in the formula 1 may have the same or different numbers of carbons. The case where $R^1$ and $R^2$ have different numbers of carbons is preferable from the viewpoint of dispersibility in water. Further, the case where $R^1$ and $R^2$ have the same number of carbons is preferable from the viewpoint of scent retaining performance.

When the hydrocarbon groups of $R^1$ and $R^2$ in the formula 1 include a branched chain, a degree of branching defined by the following formula is preferably 0.3 or less, more preferably 0.2 or less, further preferably 0.1 or less and furthermore preferably 0.08 or less from the viewpoint of scent retaining performance, and preferably 0.01 or more, more preferably 0.02 or more and further preferably 0.04 or more from the viewpoint of scent retaining performance.

$$\text{Degree of branching} = \left[\left(\text{total number of terminal methyl groups in } R^1 \text{ and } R^2\right) - 2\right] / \left(\text{total carbon number of } R^1 \text{ and } R^2\right)$$

Note that a degree of branching is an average value that can be measured with 1H-NMR.

Component (B) may be one or more compounds selected from a compound of the formula 1 in which $R^1$ and $R^2$ represent a hydrocarbon group of the same structure and a compound of the formula 1 in which $R^1$ and $R^2$ represent hydrocarbon groups of different structures.

Component (B) is preferably a compound in which $R^1$ and $R^2$ represent a hydrocarbon group of the same structure from the viewpoint of scent retaining performance.

Component (B) is preferably a compound in which $R^1$ and $R^2$ represent hydrocarbon groups of different structures from the viewpoint of dispersibility in water.

For example, the fragrance composition of the present invention can contain a compound represented by the formula 1 in which $R^1$ and $R^2$ represent a hydrocarbon group of the same structure and a compound represented by the formula 1 in which $R^1$ and $R^2$ represent hydrocarbon groups of different structures as component (B).

$A^1O$ and $A^2O$ in the formula 1 each represent an alkyleneoxy group with 2 or more and 4 or less carbons and from the viewpoint of scent retaining performance preferably with 2 or 3 carbons, with $A^1$ and $A^2$ being alkylene groups. x1 and x2 in the formula 1 represent average numbers of added moles of $A^1O$ and $A^2O$, respectively, and each represent a number of 0 or more and 10 or less, preferably 6 or less, more preferably 4 or less and further preferably 2 or less from the viewpoint of scent retaining performance, and further preferably 0.

M in the formula 1 is a cation. M is preferably a cation other than a hydrogen ion. Examples of M include, for example, an alkali metal ion such as a lithium ion, a sodium ion, a potassium ion or the like, an alkaline earth metal ion such as a calcium ion, a barium ion or the like, an organic ammonium ion such as a triethanolammonium ion, a diethanolammonium ion, a monoethanolammonium ion, a trimethylammonium ion, a monomethylammonium ion or the like and others.

M is preferably an alkali metal ion or an alkanolammonium ion, more preferably a sodium ion, a potassium ion, a triethanolammonium ion, a diethanolammonium ion or a monoethanolammonium ion and further preferably a sodium ion from the viewpoint of dispersibility in water.

Component (B) of the present invention is preferably a compound represented by the formula 1-1 below. In other words, the present invention provides a fragrance composition containing a compound represented by the formula 1-1 below as component (B). A compound of the formula 1-1 is a compound of the formula 1 in which x1 and x2 each represent 0.

Formula 1-1

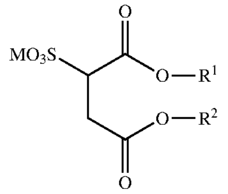

wherein $R^1$ and $R^2$ each represent a hydrocarbon group, $R^1$ and $R^2$ have 17 or more carbons in total and M is a cation.

The specific examples or preferable examples of $R^1$, $R^2$ and M in the formula 1-1 are the same as in the formula 1.

Component (B) can be synthesized by a publicly-known method. For example, it can be obtained by reacting a maleic acid diester obtained by reacting maleic anhydride and an alcohol with hydrogen sulfite. At that time, alcohols of different carbon numbers or structures can be used to obtain a compound of the formula 1 in which $R^1$ and $R^2$ represent hydrocarbon groups of different structures. Component (B) can be synthesized, for example, by the processes described in Examples 2 to 3 of US-A 2007/0214999.

Examples of a suitable alcohol used for producing component (B) include:

(1) a primary alcohol represented by 2-propylheptan-1-ol, 2-butyloctan-1-ol, a branched-chain decyl alcohol (for example, decyl alcohol manufactured by KH Neochem Co. Ltd.) or the like; and (2) a secondary alcohol represented by 5-nonanol, 2,6-dimethyl-4-heptanol or the like.

Component (B) is preferably a di(2-propylheptyl) sulfosuccinate from the viewpoints of dispersibility in water and scent retaining performance. The salt is preferably an alkali metal salt or an alkanolamine salt, more preferably a sodium salt, a potassium salt, a triethanolamine salt, a diethanolamine salt or a monoethanolamine salt and further preferably a sodium salt.

The fragrance composition of the present invention contains component (A) in an amount of preferably 0.1 mass % or more, more preferably 0.5 mass % or more and further preferably 0.9 mass % or more, and preferably 2 mass % or less, more preferably 1.5 mass % or less and further preferably 1 mass % or less.

The fragrance composition of the present invention contains component (B) in an amount of preferably 2 mass % or more, more preferably 3 mass % or more and further preferably 4 mass % or more, and preferably 7 mass % or less, more preferably 6 mass % or less and further preferably 5 mass % or less.

A proportion of component (A) relative to 100 parts by mass of component (B) in the fragrance composition of the present invention is preferably 10 parts by mass or more, more preferably 12.5 parts by mass or more and further preferably 15 parts by mass or more, and preferably 100 parts by mass or less, more preferably 60 parts by mass or less, further preferably 50 parts by mass or less and furthermore preferably 30 parts by mass or less from the viewpoints of dispersibility in water and scent retaining performance.

In the fragrance composition of the present invention, component (B) is considered to improve a degree of delivery of component (A) to an object. In the fragrance composition of the present invention, when the composition is brought into contact with an object and components (A) and (B) are adhered to the object, component (A) may impart its effect to the object for a longer period of time than in the case of absence of component (B).

The fragrance composition of the present invention can also optionally contain a surfactant other than component (B). A proportion of component (B) in all surfactants in the fragrance composition of the present invention is preferably 80 mass % or more, more preferably 90 mass % or more and further preferably 99 mass % or more, and preferably 80 mass % or less, more preferably 90 mass % or less and further preferably 100 mass % or less from the viewpoints of dispersibility in water and scent retaining performance.

The fragrance composition of the present invention preferably contains water. The fragrance composition of the present invention can contain water in an amount of, for example, 85 mass % or more, further 90 mass % or more and further 95 mass % or more, and 98 mass % or less, further 97 mass % or less and further 96 mass % or less.

The fragrance composition of the present invention may be a fragrance composition obtained by mixing components (A) and (B) with water, for example, a dispersion liquid or a solubilization liquid obtained by dispersing or solubilizing component (A) in water in the presence of component (B).

The fragrance composition of the present invention can be formulated with an optional component. It can be formulated with an optional component such as a solvent, a pH adjuster, an oil agent, an antiseptic or the like from the viewpoint of actual use. Examples of the solvent include ethanol, isopropanol, glycerin, ethylene glycol, propylene glycol or the like.

The fragrance composition of the present invention can be used in various products as a scent imparting component. For example, a detergent, a softening agent, cosmetics, hair cosmetics, a styling agent for clothing, an air refreshing agent, a bathwater additive, a perfume or the like can be formulated with the fragrance composition of the present invention. These may be a spray-type product.

[Method for Imparting Scent]

The fragrance composition of the present invention is suitable as a component for imparting a scent to various objects, for example, fibers such as a textile product or the like. The present invention provides a method for imparting a scent including, treating an object with the fragrance composition of the present invention (hereinafter also referred to as a method for imparting a scent of the present invention). The matters stated in the fragrance composition of the present invention can be appropriately applied to the method for imparting a scent of the present invention. The fragrance composition used in the method for imparting a scent of the present invention may be a fragrance composition obtained by mixing components (A) and (B) with water, for example, a dispersion liquid or a solubilization liquid obtained by dispersing or solubilizing component (A) in water in the presence of component (B).

Examples of the object in the method for imparting a scent of the present invention include one or more selected from fibers (excluding hair), skin, hair and hard articles. Fibers hereinafter mean fibers excluding hair. Fibers are a suitable object in the method for imparting a scent of the present invention.

The fibers may be either hydrophobic fibers or hydrophilic fibers. Examples of the hydrophobic fibers include, for example, protein fibers (milk protein casein fiber, promix or the like), polyamide fibers (nylon or the like), polyester fibers (polyester or the like), polyacrylonitrile fibers (acrylic or the like), polyvinyl alcohol fibers (vinylon or the like), polyvinyl chloride fibers (polyvinyl chloride or the like), polyvinylidene chloride fibers (vinylidene or the like), polyolefin fibers (polyethylene, polypropylene or the like), polyurethane fibers (polyurethane or the like), polyvinyl chloride/polyvinyl alcohol copolymer fibers (Polyclar or the like), polyalkylene paraoxybenzoate fibers (benzoate or the like), polyfluoroethylene fibers (polytetrafluoroethylene or the like) and others. Examples of the hydrophilic fibers include, for example, seed hair fibers (cotton, cotton, kapok or the like), bast fibers (hemp, flax, ramie, cannabis, jute or the like), vein fibers (manila hemp, sisal hemp or the like), palm fibers, juncus, straw, animal hair fibers (wool, mohair, cashmere, camel hair, alpaca, vicuna, angora or the like), silk fibers (domestic silk and wild silk), feathers, cellulose fibers (rayon, polynosic, cupro, acetate or the like) and others.

From the viewpoint of scent retaining performance, the fibers are preferably one or more selected from cotton fiber, polyamide fiber (nylon or the like) and polyester fiber (polyester or the like) and more preferably cotton fiber.

A content of cotton fiber in the fibers is preferably 5 mass % or more, more preferably 10 mass % or more, further preferably 15 mass % or more, furthermore preferably 20 mass % or more and furthermore preferably 100 mass % from the viewpoint of scent retaining performance.

A content of polyamide fiber (nylon or the like) in the fibers is preferably 5 mass % or more and more preferably 10 mass % or more, and preferably 30 mass % or less and more preferably 20 mass % or less from the viewpoint of scent retaining performance.

Further, a content of polyester fiber (polyester or the like) in the fibers is preferably 70 mass % or more and more preferably 80 mass % or more, and preferably 100 mass % or less and more preferably 90 mass % or less from the viewpoint of scent retaining performance.

The fibers are preferably a textile product, and examples of the textile product include textiles such as a woven material, a knitted material, a nonwoven fabric and others using the above fibers, for example, the hydrophobic fibers or hydrophilic fibers, and products obtained by using them, such as an undershirt, a T-shirt, a dress shirt, a blouse, slacks, a cap and other types of clothing, bedding, a handkerchief, a towel, knitwear, socks, underwear, tights and others, or the like. From the viewpoint of scent retaining performance after treatment with the fragrance composition of the present invention, preferable textile products are cloth such as a woven material, a knitted material or the like and a woven textile, and from the same viewpoint, a preferable textile product is a textile product containing one or more selected from cotton fiber, polyamide fiber (nylon or the like) and polyester fiber (polyester or the like), more preferably cloth or a textile formed by weaving one or more selected from cotton fiber, polyamide fiber (nylon or the like) and polyester fiber (polyester or the like) and further preferably cloth or a textile formed by weaving cotton fiber. Preferable aspects of contents of cotton fiber, polyamide fiber (nylon or the like) and polyester fiber (polyester or the like) in the textile product are the same as of contents of cotton fiber, polyamide fiber (nylon or the like) and polyester fiber (polyester or the like) in the fibers, respectively.

In the method for imparting a scent of the present invention, the fragrance composition is used such that a proportion of component (A) relative to 100 parts by mass of component (B) is preferably 10 parts by mass or more, more preferably 12.5 parts by mass or more and further preferably 15 parts by mass or more, and preferably 100 parts by mass or less, more preferably 60 parts by mass or less, further preferably 50 parts by mass or less and furthermore preferably 30 parts by mass or less from the viewpoints of dispersibility in water and scent retaining performance.

In the method for imparting a scent of the present invention, the object is preferably treated with a treatment liquid containing component (A), component (B) and water (hereinafter also referred to as a treatment liquid of the present invention). A content of component (B) in the treatment liquid of the present invention can be, for example, 0.0001 mass % or more, 0.001 mass % or more, further 0.01 mass % or more and further 0.1 mass % or more, and 20 mass % or less, further 10 mass % or less, further 5 mass % and further 1 mass % or less, although it depends on the object. A proportion of component (A) relative to 100 parts by mass of component (B) in the treatment liquid of the present invention preferably also falls within the above range. The treatment liquid of the present invention may be obtained by mixing the fragrance composition of the present invention with water. Further, the treatment liquid of the present invention may also be the fragrance composition.

When the method for imparting a scent of the present invention is directed to fibers, component (B) is used in an amount of, from the viewpoint of scent retaining performance, preferably 0.01% o.w.f. or more, more preferably 0.03% o.w.f. or more, further preferably 0.05% o.w.f. or more, furthermore preferably 0.1% o.w.f. or more, furthermore preferably 0.2% o.w.f. or more and furthermore preferably 0.3% o.w.f. or more, and from the viewpoint of finishing performance such as texture after drying or the like, preferably 5% o.w.f. or less, more preferably 4% o.w.f. or less, further preferably 3% o.w.f. or less and furthermore preferably 2% o.w.f. or less relative to the fibers. Note that % o.w.f. stands for % on the weight of fabric and means a percentage of a mass of component (B) relative to a mass of the fibers. The treatment liquid of the present invention can be used such that an amount of component (B) relative to the fibers falls within the above range.

In the present invention, components (A) and (B) are preferably used by mixing with water having a hardness of 0° DH or more and 30° DH or less. In other words, the object is preferably treated with a treatment liquid obtained by mixing components (A) and (B) with water having a hardness of 0° DH or more and 30° DH or less. The treatment liquid may be a treatment liquid obtained by mixing the fragrance composition of the present invention with water having a hardness of 0° DH or more and 30° DH or less. From the viewpoint of scent retaining performance, a hardness of water is preferably 1° DH or more, more preferably 2° DH or more and further preferably 3° DH or more, and may be 25° DH or less and further 20° DH or less.

The treatment liquid of the present invention may have a hardness of 0° DH or more and 30° DH or less. From the viewpoint of scent retaining performance, a hardness of the treatment liquid of the present invention is preferably 1° DH or more, more preferably 2° DH or more and further preferably 3° DH or more, and may be 25° DH or less and further 20° DH or less.

When the method for imparting a scent of the present invention is directed to fibers, a bath ratio (a mass of water (kg) relative to 1 kg of the fibers) is preferably 10 or more, more preferably 15 or more and further preferably 20 or more, and may be 100 or less, 50 or less, 40 or less and 30 or less from the viewpoint of ensuring uniformity of treatment and scent retaining performance. When the treatment liquid of the present invention is used, this bath ratio may be a mass of the treatment liquid relative to 1 kg of the fibers.

When the method for imparting a scent of the present invention is directed to fibers, the method can be carried out by being incorporated into laundering processes of the fibers, for example, cloth or a textile. Here, the laundering processes may be washing, rinsing and dewatering treatments of the fibers. In the present invention, during any of these laundering processes, the fragrance composition of the present invention can be applied to the fibers such that component (B) is in a predetermined amount.

Component (B) of the present invention is considered to be excellent in the effect of delivering component (A) and high in the ability to improve a degree of delivery of component (A) especially when component (A) is delivered to an object such as fibers or the like in an aqueous system. For example, the present invention provides a method for improving delivery of component (A) including, when delivering component (A) to an object in the presence of water, using component (B) in combination to improve delivery of component (A) to the object. Component (B) may be, for example, a scent imparting improving agent for a fragrance composition which is component (A). Further, the present invention provides a method for improving scent retaining performance including, imparting a scent to an object with component (A) in the coexistence of component (B). The matters stated in the fragrance composition and the method for imparting a scent of the present invention can be appropriately applied to the method for improving scent retaining performance of the present invention. In the method for improving scent retaining performance of the present invention, water having a hardness of 1° DH or more, further 2° DH or more and further 3° DH or more, and 30° DH or less, further 25° DH or less and further 20° DH or less is preferably further made to coexist from the viewpoint of improving scent retaining performance.

Examples

Example 1 and Comparative Example 1

(1) Pretreatment of Towel for Evaluation

Towels from which starching agents and impurities had been removed in advance by performing the following treatment were used as towels for evaluations.

Using a fully automatic washing machine (model number NA-F60PB3 manufactured by Panasonic Corporation), a series of laundering processes (water amount 50 L, washing for 10 minutes→water-saving rinsing twice→dewatering for 9 minutes) was repeated three times on 24 commercially available cotton towels (TW 220 manufactured by Yoshikawa Towel Co., Ltd., white) or chemical fiber towels (YUI, gray/brown, polyester 85%/nylon 15%) by adding 52.22 g of a 10% diluted liquid of a nonionic surfactant (EMULGEN 108 manufactured by Kao Corporation) as a detergent and using tap water in Wakayama City as water. Subsequently, the series of laundering processes was repeated twice with water alone. After that, the towels were naturally dried by leaving them alone at a room temperature (25° C.) for 24 hours.

(2) Method for Treating Towel

After a treatment liquid was prepared by putting a predetermined amount of ion exchange water (bath ratio 20 kg/kg-towel) into a portable washing machine (model number NA-35 manufactured in the name of National), adding an aqueous calcium chloride solution (equivalent to 4000° DH) such that the treatment liquid had a hardness shown in Table 1, adding a 5 mass % aqueous dispersion liquid of a fragrance composition shown in Table 1 under stirring such that the concentration of component (B) was the treatment concentration (% o.w.f.) shown in Table 1 and stirring them for 1 minute, two towels (a total of about 140 g) pretreated in the above (1) were put thereinto and treated for 3 minutes under stirring. After that, the towels were dewatered for 2 minutes in a dewatering tub of a twin tub washing machine (model number VH-52G(H) manufactured by TOSHIBA CORPORATION) and dried in a room at 23° C./45% RH. Note that the treatment liquid prepared here is also a fragrance composition.

(3) Evaluation of Scent Retaining Performance (3-1) Evaluation 1 (Scent Retaining Performance by Paired Evaluation)

On the towels treated in (2), scent retaining performance 8 hours and 24 hours after dewatering was evaluated by four panelists specializing in scents. The four panelists each compared towels of an example and a comparative example of the same test group at the same elapsed time after dewatering, and when there was a difference in scent strength, gave 3 points to the stronger one and 1 point to the weaker one, and when the scent strength was the same, gave 2 points to each one to determine a total point of evaluation scores by the four. The evaluation results are shown in Table 1.

(3-2) Evaluation 2 (Scent Retaining Performance by Point-Addition Evaluation)

On the towels treated in (2), scent retaining performance 4 hours and 24 hours after dewatering was evaluated by four panelists specializing in scents in accordance with the evaluation criteria below. Evaluation scores by the four panelists on each towel of the same test group after the same time had elapsed were totaled. At that time, they were permitted to give an evaluation score to one decimal place referring to the evaluation criteria below. A total evaluation score 24 hours later divided by a total evaluation score 4 hours later was given as a degree of scent retention 24 hours after dewatering with respect to 4 hours after dewatering (indicated as degree of scent retention $A_{(24/4)}$ in the table). The evaluation results are shown in Table 1.

(Evaluation Criteria)

0: scentless
1: barely sensible scent (sensing threshold)
2: scent is weak, but one can recognize what odor it is (recognition threshold)
3: easily sensible scent
4: strong scent
5: very strong scent Note that the larger a score is, the stronger a scent is and the higher a scent retaining performance effect is.

TABLE 1

| | | | | Test group Ia | | Test group Ib | | Test group Ic | |
|---|---|---|---|---|---|---|---|---|---|
| | | | | Example 1-1 | Comparative example 1-1 | Example 1-2 | Comparative example 1-2 | Example 1-3 | Comparative example 1-3 |
| Fragrance composition | Mass ratio | (A) | Phenylethyl alcohol (LogP 1.10) | 1 | 1 | — | — | — | — |
| | | | Eugenol (LogP 2.73) | — | — | 1 | 1 | — | — |
| | | | Estragole (LogP 3.47) | — | — | — | — | 1 | 1 |
| | | | α-hexylcinnamaldehyde (LogP 4.82) | — | — | — | — | — | — |
| | | (B) | Sodium di(2-propylheptyl) sulfosuccinate | 5 | — | 5 | — | 5 | — |
| | | (B') | Sodium di(2-ethylhexyl) sulfosuccinate | — | 5 | — | 5 | — | 5 |
| Treatment condition | Object to be treated | | | Cotton towel | | Cotton towel | | Cotton towel | |
| | Bath ratio | | | 20 | | 20 | | 20 | |
| | Hardness of treatment liquid [°DH] | | | 4 | | 4 | | 4 | |
| | Treatment concentration [% o.w.f.] | | | 0.3 | | 0.3 | | 0.3 | |
| Scent retaining performance | Evaluation 1 | | 8 hours after dewatering | 10 | 6 | 11 | 5 | 10 | 6 |
| | | | 24 hours after dewatering | 10 | 6 | 11 | 5 | 10 | 6 |
| | Evaluation 2 | | Degree of scent retention $A_{(24/4)}$ | 0.44 | 0.33 | 0.49 | 0.42 | 0.60 | 0.43 |

| | | | | Test group Id | | Test group Ie | | Test group If | |
|---|---|---|---|---|---|---|---|---|---|
| | | | | Example 1-4 | Comparative example 1-4 | Example 1-5 | Comparative example 1-5 | Example 1-6 | Comparative example 1-6 |
| Fragrance composition | Mass ratio | (A) | Phenylethyl alcohol (LogP 1.10) | — | — | — | — | — | — |
| | | | Eugenol (LogP 2.73) | — | — | 1 | 1 | 1 | 1 |
| | | | Estragole (LogP 3.47) | — | — | — | — | — | — |
| | | | α-hexylcinnamaldehyde (LogP 4.82) | 1 | 1 | — | — | — | — |
| | | (B) | Sodium di(2-propylheptyl) sulfosuccinate | 5 | — | 5 | — | 5 | — |

TABLE 1-continued

| | | | | | | | | |
|---|---|---|---|---|---|---|---|---|
| | (B') | Sodium di(2-ethylhexyl) sulfosuccinate | — | 5 | — | 5 | — | 5 |
| Treatment condition | Object to be treated | | Cotton towel | | Cotton towel | | Chemical fiber towel | |
| | Bath ratio | | 20 | | 20 | | 20 | |
| | Hardness of treatment liquid [°DH] | | 4 | | 20 | | 4 | |
| | Treatment concentration [% o.w.f.] | | 0.3 | | 0.3 | | 0.3 | |
| Scent retaining performance | Evaluation 1 | 8 hours after dewatering | 10 | 6 | 11 | 5 | 10 | 6 |
| | | 24 hours after dewatering | 11 | 5 | 10 | 6 | 10 | 6 |
| | Evaluation 2 | Degree of scent retention $A_{(24/4)}$ | 0.86 | 0.79 | 0.42 | 0.40 | 0.52 | 0.41 |

In each test group in Table 1, higher scent retaining performance was exhibited 8 hours and 24 hours after dewatering when using a fragrance composition of an example than when using a fragrance composition of a comparative example as shown in Evaluation 1.

Further, in each test group in Table 1, a fragrance composition of an example has a higher value of a degree of scent retention $A_{(24/4)}$ than a comparative example as shown in Evaluation 2, and is thus found to have a higher effect of maintaining scent retaining performance over time.

While it was confirmed that component (A) alone was not dissolved or difficult to dissolve in water, component (A) was solubilized when used in combination with component (B) of an example or component (B') of a comparative example. Further, component (A) is considered to have been adsorbed to fibers as the fibers were imparted a scent by treating the fibers with the fragrance composition in the above manner. Further, component (B) is considered to be higher in the effect of delivering component (A) than component (B') as higher scent retaining performance was attained when using component (B) than when using component (B').

Thus, component (B) carries component (A) to an object such as fibers or the like more effectively to allow the function and effect of component (A) to be exhibited on the object.

Example 2 and Comparative Example 2

(1) Pretreatment of Evaluation Fabric

Fabrics from which starching agents and impurities had been removed in advance by performing the following treatment were used as fabrics for evaluations.

Using a fully automatic washing machine (model number NA-F60PB3 manufactured by Panasonic Corporation), a series of laundering processes (water amount 45 L, washing for 10 minutes→water-saving rinsing twice→dewatering for 9 minutes) was repeated twice on 1.8 kg of a knitted cotton fabric (knitted cotton fabric manufactured by SHIKISEN-SHA CO., LTD. described as cotton fabric in Table 2) or a polyester jersey fabric (manufactured by Senshoku Shizai Kabushiki Kaisha Tanigashira Shoten and described as chemical fiber fabric in Table 2) by adding 45 g of a 10% diluted liquid of a nonionic surfactant (EMULGEN 108 manufactured by Kao Corporation) as a detergent and using tap water in Wakayama City as water. Subsequently, the series of laundering processes was repeated three times with water alone. After that, the fabrics were naturally dried by leaving them alone at a room temperature (25° C.) for 24 hours and all cut into a square of 6 cm×6 cm to obtain test fabrics.

(2) Method for Treating Test Fabric

A 5 mass % aqueous dispersion liquid of a fragrance composition shown in Table 2 was diluted with an aqueous calcium chloride solution (equivalent to 4° DH) such that the concentration of component (B) was the concentration shown in Table 2 to obtain a treatment liquid. The treatment liquid was added dropwise to a test fabric treated in (1) at the mass ratio in Table 2, and the fabric was dried in a room at 23° C./35% RH.

(3) Evaluation of Scent Retaining Performance (3-1) Evaluation 1 (Scent Retaining Performance by Paired Evaluation)

On the test fabric treated in (2), scent retaining performance 6 hours and 24 hours after dropwise addition of the treatment liquid was evaluated by four panelists specializing in scents. The four panelists each compared test fabrics of an example and a comparative example of the same test group after the same time had elapsed, and when there was a difference in scent strength, gave 3 points to the stronger one and 1 point to the weaker one, and when the scent strength was the same, gave 2 points to each one to determine a total point of evaluation scores by the four. The evaluation results are shown in Table 2.

(3-2) Evaluation 2 (Scent Retaining Performance by Point-Addition Evaluation)

On the test fabric treated in (2), scent retaining performance 6 hours and 24 hours after dropwise addition of the treatment liquid was evaluated by four panelists specializing in scents in accordance with the evaluation criteria below. Evaluation scores by the four panelists on each test fabric of the same test group after the same time had elapsed were totaled. At that time, they were permitted to give an evaluation score to one decimal place referring to the evaluation criteria below. A total evaluation score 24 hours later divided by a total evaluation score 6 hours later was given as a degree of scent retention 24 hours after dropwise addition with respect to 6 hours after dropwise addition (indicated as degree of scent retention $B_{(24/6)}$ in the table). The evaluation results are shown in Table 2.

(Evaluation Criteria)

0: scentless

1: barely sensible scent (sensing threshold)

2: scent is weak, but one can recognize what odor it is (recognition threshold)

3: easily sensible scent

4: strong scent

5: very strong scent

Note that the larger a score is, the stronger a scent is and the higher a scent retaining performance effect is.

TABLE 2

| | | | | Test group IIa | | Test group IIb | | Test group IIc | |
|---|---|---|---|---|---|---|---|---|---|
| | | | | Example 2-1 | Comparative example 2-1 | Example 2-2 | Comparative example 2-2 | Example 2-3 | Comparative example 2-3 |
| Fragrance composition | Mass ratio | (A) | Phenylethyl alcohol (LogP 1.10) | 2 | 2 | — | — | — | — |
| | | | Eugenol (LogP 2.73) | — | — | 2 | 2 | — | — |
| | | | α-hexylcinnamaldehyde (LogP 4.82) | — | — | — | — | 2 | 2 |
| | | (B) | Sodium di(2-propylheptyl) sulfosuccinate | 5 | — | 5 | — | 5 | — |
| | | (B') | Sodium di(2-ethylhexyl) sulfosuccinate | — | 5 | — | 5 | — | 5 |
| Treatment condition | Object to be treated | | | Cotton fabric [6 cm × 6 cm] | | Cotton fabric [6 cm × 6 cm] | | Cotton fabric [6 cm × 6 cm] | |
| | Concentration of component (B) in treatment liquid [ppm] | | | 2000 | | 2000 | | 2000 | |
| | Mass of treatment liquid/ mass of test fabric [mass ratio] | | | 1/1 | | 1/1 | | 1/1 | |
| | Hardness of treatment liquid [°DH] | | | 4 | | 4 | | 4 | |
| Scent retaining performance | Evaluation 1 | | 6 hours after dropwise addition of treatment liquid | 11 | 5 | 9 | 7 | 10 | 6 |
| | | | 24 hours after dropwise addition of treatment liquid | 11 | 5 | 11 | 5 | 9 | 7 |
| | Evaluation 2 | | Degree of scent retention $B_{(24/6)}$ | 0.91 | 0.83 | 0.74 | 0.68 | 0.92 | 0.89 |

| | | | | Test group IId | | Test group IIe | | Test group IIf | |
|---|---|---|---|---|---|---|---|---|---|
| | | | | Example 2-4 | Comparative example 2-4 | Example 2-5 | Comparative example 2-5 | Example 2-6 | Comparative example 2-6 |
| Fragrance composition | Mass ratio | (A) | Phenylethyl alcohol (LogP 1.10) | 2 | 2 | — | — | — | — |
| | | | Eugenol (LogP 2.73) | — | — | 2 | 2 | — | — |
| | | | α-hexylcinnamaldehyde (LogP 4.82) | — | — | — | — | 2 | 2 |
| | | (B) | Sodium di(2-propylheptyl) sulfosuccinate | 5 | — | 5 | — | 5 | — |
| | | (B') | Sodium di(2-ethylhexyl) sulfosuccinate | — | 5 | — | 5 | — | 5 |
| Treatment condition | Object to be treated | | | Chemical fiber fabric [6 cm × 6 cm] | | Chemical fiber fabric [6 cm × 6 cm] | | Chemical fiber fabric [6 cm × 6 cm] | |
| | Concentration of component (B) in treatment liquid [ppm] | | | 2000 | | 2000 | | 2000 | |
| | Mass of treatment liquid/ mass of test fabric [mass ratio] | | | 1/1 | | 1/1 | | 1/1 | |
| | Hardness of treatment liquid [°DH] | | | 4 | | 4 | | 4 | |
| Scent retaining performance | Evaluation 1 | | 6 hours after dropwise addition of treatment liquid | 10 | 6 | 10 | 6 | 11 | 5 |
| | | | 24 hours after dropwise addition of treatment liquid | 10 | 6 | 11 | 5 | 9 | 7 |
| | Evaluation 2 | | Degree of scent retention $B_{(24/6)}$ | 0.63 | 0.57 | 0.72 | 0.65 | 0.74 | 0.73 |

In Table 2, a fragrance composition of an example attains more excellent results than a comparative example in both evaluations 1 and 2, and an example is thus found to exhibit higher scent retaining performance also in the treatment method for Table 2 different from that for Table 1.

Example 3 and Comparative Example 3

(3) Test Method

A 5 mass % aqueous dispersion liquid of a fragrance composition shown in Table 3 was diluted with an aqueous calcium chloride solution (equivalent to 4° DH) such that the concentration of component (B) was the concentration shown in Table 3 to obtain a liquid for evaluations. 80 ml of the liquid for evaluations was placed in a standardized bottle No. 11 (5-130-07 by AS ONE Corporation), and a paper towel (super absorbent kitchen towel Elleair of 12 cm×12 cm) was rolled up and placed standing in the bottle containing this liquid for evaluations. At that time, the kitchen towel was placed such that a lower portion thereof was immersed in the liquid and an upper portion thereof was exposed from a liquid surface. After that, it was left alone in a room at 23° C./35% RH.

(2) Evaluation of Scent Retaining Performance (2-1) Evaluation 1 (Scent Retaining Performance by Paired Evaluation)

On the liquid for evaluations in (1), scent retaining performance 24 hours and 72 hours after leaving alone was evaluated by three panelists specializing in scents. The three panelists each compared test solutions of an example and a comparative example of the same test group after the same time had elapsed, and when there was a difference in scent strength, gave 3 points to the stronger one and 1 point to the weaker one, and when the scent strength was the same, gave 2 points to each one to determine a total point of evaluation scores by the three. The evaluation results are shown in Table 3.

(2-2) Evaluation 2 (Scent Retaining Performance by Point-Addition Evaluation)

On the liquid for evaluations in (1), scent retaining performance 24 hours and 72 hours after leaving alone was evaluated by three panelists specializing in scents in accordance with the evaluation criteria below. Evaluation scores by the three panelists on each test solution of the same test group after the same time had elapsed were totaled. At that time, they were permitted to give an evaluation score to one decimal place referring to the evaluation criteria below. A total evaluation score 72 hours later divided by a total evaluation score 24 hours later was given as a degree of scent retention 72 hours after leaving alone with respect to 24 hours after leaving alone (indicated as degree of scent retention $C_{(72/24)}$ in the table). The evaluation results are shown in Table 3.

(Evaluation Criteria)

0: scentless

1: barely sensible scent (sensing threshold)

2: scent is weak, but one can recognize what odor it is (recognition threshold)

3: easily sensible scent

4: strong scent

5: very strong scent

Note that the larger a score is, the stronger a scent is and the higher a scent retaining performance effect is.

TABLE 3

| | | | | Test group IIIa | | Test group IIIb | | Test group IIIc | |
|---|---|---|---|---|---|---|---|---|---|
| | | | | Example 3-1 | Comparative example 3-1 | Example 3-2 | Comparative example 3-2 | Example 3-3 | Comparative example 3-3 |
| Fragrance composition | Mass ratio | (A) | Phenylethyl alcohol (LogP 1.10) | 2 | 2 | — | — | — | — |
| | | | Eugenol (LogP 2.73) | — | — | 2 | 2 | — | — |
| | | | α-hexylcinnamaldehyde (LogP 4.82) | — | — | — | — | 2 | 2 |
| | | (B) | Sodium di(2-propylheptyl) sulfosuccinate | 5 | — | 5 | — | 5 | — |
| | | (B') | Sodium di(2-ethylhexyl) sulfosuccinate | — | 5 | — | 5 | — | 5 |
| Treatment condition | Concentration of component (B) in treatment liquid [ppm] | | | 200 | | 200 | | 200 | |
| | Hardness of treatment liquid [°DH] | | | 4 | | 4 | | 4 | |
| Scent retaining performance | Evaluation 1 | | 24 hours later | 8 | 4 | 8 | 4 | 9 | 3 |
| | | | 72 hours later | 8 | 4 | 7 | 5 | 9 | 3 |
| | Evaluation 2 | | Degree of scent retention $C_{(72/24)}$ | 0.57 | 0.53 | 0.77 | 0.73 | 0.50 | 0.45 |

In Table 3, a fragrance composition of an example attains more excellent results than a comparative example in both evaluations 1 and 2, and an example is thus found to exhibit higher scent retaining performance also in a usage form considering spatial volatilization of a fragrance composition such as a standing-type air refreshing agent.

Note that the following components were used as the components shown in Tables 1 to 3.

Phenylethyl alcohol (model number 168-00893 manufactured by FUJIFILM Wako Pure Chemical Corporation, active component more than 98.0%)

Eugenol (model number 057-03935 manufactured by FUJIFILM Wako Pure Chemical Corporation, active component more than 95.0%)

Estragole (model number A29208-25G manufactured by Sigma-Aldrich, active component 98.0%)

α-hexylcinnamaldehyde (model number 088-04605 manufactured by FUJIFILM Wako Pure Chemical Corporation, active component more than 97.0%)

Sodium di(2-propylheptyl) sulfosuccinate
Sodium di(2-ethylhexyl) sulfosuccinate

Even if a di(2-butyloctyl) sulfosuccinate, a dodecyl/2-butyloctyl-sulfosuccinate, an octyl/cetyl-sulfosuccinate or a dodecyl/3-nonenyl-sulfocuccinate is used as component (B) in a fragrance composition in Tables 1 to 3 instead of component (B) in the tables, the effect of the present invention can be obtained in the same manner.

Example 4 and Comparative Example 4

Scent retaining performance evaluation 1 (scent retaining performance by paired evaluation) was performed in the same manner as in example 1 and comparative example 1, provided that fragrance compositions and treatment conditions were as in Table 4. The evaluation results are shown in Table 4.

TABLE 4

| | | | | Test group IVa | | Test group IVb | |
|---|---|---|---|---|---|---|---|
| | | | | Example 4-1 | Comparative example 4-1 | Example 4-2 | Comparative example 4-2 |
| Fragrance composition | Mass ratio | (A) | Phenylethyl alcohol (LogP 1.10) | 1 | 1 | — | — |
| | | | Eugenol (LogP 2.73) | — | — | 1 | 1 |
| | | (B) | Sodium di(2-butyloctyl) sulfosuccinate | 5 | — | 5 | — |
| | | (B') | Sodium di(2-ethylhexyl) sulfosuccinate | — | 5 | — | 5 |
| Treatment condition | Object to be treated | | | Cotton towel | | Cotton towel | |
| | Bath ratio | | | 20 | | 20 | |
| | Hardness of treatment liquid [°DH] | | | 4 | | 20 | |
| | Treatment concentration [% o.w.f.] | | | 0.3 | | 0.3 | |
| Scent retaining performance evaluation | | | 8 hours after dewatering | 10 | 6 | 10 | 6 |
| | | | 24 hours after dewatering | 9 | 7 | 9 | 7 |

Example 5 and Comparative Example 5

Scent retaining performance evaluation 2 (scent retaining performance by point-addition evaluation) was performed in the same manner as in example 1 and comparative example 1, provided that fragrance compositions and treatment conditions were as in Table 5 and dewatering in the method for treating towel in (2) was carried out by using a dewatering tub of a twin tub washing machine (model number PS-55AS2 manufactured by Hitachi, Ltd.). The evaluation results are shown in Table 5.

TABLE 5

| | | | | Test group V | | |
|---|---|---|---|---|---|---|
| | | | | Example 5-1 | Example 5-2 | Comparative example 5-1 |
| Fragrance composition | Mass ratio | (A) | Eugenol (LogP 2.73) | 1 | 1 | 1 |
| | | (B) | Sodium di(2-propylheptyl)sulfosuccinate | 5 | — | — |
| | | | Sodium di(2-butyloctyl)sulfosuccinate | — | 5 | — |
| | | (B') | Sodium di(2-ethylhexyl)sulfosuccinate | — | — | 5 |
| Treatment condition | Object to be treated | | | Cotton towel | | |
| | Bath ratio | | | 20 | | |
| | Hardness of treatment liquid [°DH] | | | 20 | | |
| | Treatment concentration [% o.w.f.] | | | 0.3 | | |

TABLE 5-continued

| | | Test group V | | |
|---|---|---|---|---|
| | | Example 5-1 | Example 5-2 | Comparative example 5-1 |
| Scent retaining performance evaluation | Degree of scent retention $A_{(24/4)}$ | 0.59 | 0.55 | 0.40 |

Example 6 and Comparative Example 6

Scent retaining performance evaluation 1 (scent retaining performance by paired evaluation) was performed in the same manner as in example 2 and comparative example 2, provided that fragrance compositions and treatment conditions were as in Table 6. The evaluation results are shown in Table 6.

TABLE 6

| | | | | Test group VIa | | Test group VIb | |
|---|---|---|---|---|---|---|---|
| | | | | Example 6-1 | Comparative example 6-1 | Example 6-2 | Comparative example 6-2 |
| Fragrance composition | Mass ratio | (A) | Phenylethyl alcohol (LogP 1.10) | 2 | 2 | — | — |
| | | | Eugenol (LogP 2.73) | — | — | 2 | 2 |
| | | (B) | Sodium di(2-butyloctyl) sulfosuccinate | 5 | — | 5 | — |
| | | (B') | Sodium di(2-ethylhexyl) sulfosuccinate | — | 5 | — | 5 |
| Treatment condition | Object to be treated | | | Cotton fabric [6 cm × 6 cm] | | Cotton fabric [6 cm × 6 cm] | |
| | Concentration of component (B) in treatment liquid [ppm] | | | 2000 | | 2000 | |
| | Mass of treatment liquid/ mass of test fabric [mass ratio] | | | 1/1 | | 1/1 | |
| | Hardness of treatment liquid [°DH] | | | 4 | | 20 | |
| Scent retaining performance evaluation | | | 6 hours after dropwise addition of treatment liquid | 11 | 5 | 10 | 6 |
| | | | 24 hours after dropwise addition of treatment liquid | 11 | 5 | 9 | 7 |

Example 7 and Comparative Example 7

Scent retaining performance evaluation 2 (scent retaining performance by point-addition evaluation) was performed in the same manner as in example 2 and comparative example 2, provided that fragrance compositions and treatment conditions were as in Table 7. The evaluation results are shown in Table 7.

TABLE 7

| | | | | Test group VII | | |
|---|---|---|---|---|---|---|
| | | | | Example 7-1 | Example 7-2 | Comparative example 7-1 |
| Fragrance composition | Mass ratio | (A) | Eugenol (LogP 2.73) | 2 | 2 | 2 |
| | | (B) | Sodium di(2-propylheptyl) sulfosuccinate | 5 | — | — |

TABLE 7-continued

| | | | | Test group VII | | |
|---|---|---|---|---|---|---|
| | | | | Example 7-1 | Example 7-2 | Comparative example 7-1 |
| | | | Sodium di(2-butyloctyl) sulfosuccinate | — | 5 | — |
| | | (B') | Sodium di(2-ethylhexyl) sulfosuccinate | — | — | 5 |
| Treatment condition | Object to be treated | | | Cotton fabric [6 cm × 6 cm] | | |
| | Concentration of component (B) in treatment liquid [ppm] | | | 2000 | | |
| | Mass of treatment liquid/ mass of test fabric [mass ratio] | | | 1/1 | | |
| | Hardness of treatment liquid [°DH] | | | 20 | | |
| Scent retaining performance evaluation | | | Degree of scent retention $B_{(24/6)}$ | 0.70 | 0.65 | 0.59 |

Example 8 and Comparative Example 8

Scent retaining performance evaluation 1 (scent retaining performance by paired evaluation) was performed in the same manner as in example 3 and comparative example 3, provided that fragrance compositions and treatment conditions were as in Table 8. The evaluation results are shown in Table 8.

TABLE 8

| | | | | Test group VIIIa | | Test group VIIIb | |
|---|---|---|---|---|---|---|---|
| | | | | Example 8-1 | Comparative example 8-1 | Example 8-2 | Comparative example 8-2 |
| Fragrance composition | Mass ratio | (A) | Phenylethyl alcohol (LogP 1.10) | 2 | 2 | — | — |
| | | | α-hexylcinnamaldehyde (LogP 4.82) | — | — | 2 | 2 |
| | | (B) | Sodium di(2-butyloctyl) sulfosuccinate | 5 | — | 5 | — |
| | | (B') | Sodium di(2-ethylhexyl) sulfosuccinate | — | 5 | — | 5 |
| Treatment condition | Concentration of component (B) in treatment liquid [ppm] | | | 200 | | 200 | |
| | Hardness of treatment liquid [°DH] | | | 4 | | 4 | |
| Scent retaining performance evaluation | | | 24 hours later | 7 | 5 | 7 | 5 |
| | | | 72 hours later | 8 | 4 | 9 | 3 |

The invention claimed is:

1. A fragrance composition, comprising:

component (A): a fragrance compound; and component (B): a compound represented by formula 1:

Formula 1

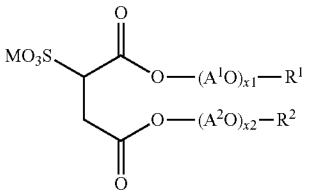

wherein $R^1$ and $R^2$ each represent a 2-propylheptyl group or a 2-butyloctyl group, $A^1O$ and $A^2O$ each represent an alkyleneoxy group with 2 or more and 4 or less carbons, with $A^1$ and $A^2$ being alkylene groups, x1 and x2 represent average numbers of added moles of $A^1O$ and $A^2O$, respectively, and each represent a number of 0 or more and 10 or less, and M is a cation.

2. The fragrance composition according to claim 1, wherein the component (A) has a Log P of 1 or more and 7 or less.

3. The fragrance composition according to claim 1, wherein the component (B) is a di(2-propylheptyl) sulfosuccinate.

4. The fragrance composition according to claim 1, wherein a proportion of the component (A) relative to 100 parts by mass of the component (B) is 10 parts by mass or more and 100 parts by mass or less.

5. A method for imparting a scent comprising treating an object with the fragrance composition according to claim 1.

6. The method for imparting a scent according to claim 5, wherein the fragrance composition is a dispersion liquid or a solubilization liquid obtained by dispersing or solubilizing the component (A) in water in the presence of the component (B).

7. The method for imparting a scent according to claim 5, wherein the object is treated with a treatment liquid obtained by mixing the components (A) and (B) with water having a hardness of 1° DH or more and 30° DH or less.

8. The method for imparting a scent according to claim 5, wherein the object is one or more selected from the group consisting of a fiber other than hair, skin, hair, and a hard article.

9. A method for improving scent retaining performance comprising imparting a scent to an object with component (A) in the presence of component (B), wherein:

component (A) is a fragrance compound; and component (B) is a compound represented by formula 1:

Formula 1

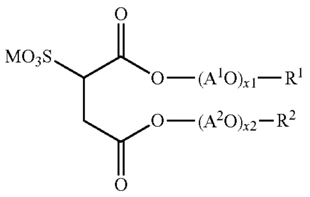

wherein $R^1$ and $R^2$ each represent a 2-propylheptyl group or a 2-butyloctyl group, $A^1O$ and $A^2O$ each represent an alkyleneoxy group with 2 or more and 4 or less carbons, with $A^1$ and $A^2$ being alkylene groups, x1 and x2 represent average numbers of added moles of $A^1O$ and $A^2O$, respectively, and each represent a number of 0 or more and 10 or less, and M is a cation.

10. The method for improving scent retaining performance according to claim 9, comprising imparting the scent in the presence of water having a hardness of 1°DH or more and 30° DH or less.

11. The fragrance composition according to claim 1, wherein the component (A) is one or more selected from the group consisting of a hydrocarbon, an alcohol, a phenol, an aldehyde, a ketone, an acetal, an ether, an ester, a carbonate, a lactone, an oxime, a nitrile, a Schiff base, an amide, a nitrogen-containing compound, a sulfur-containing compound, a natural essential oil, and a natural extract.

12. The fragrance composition according to claim 1, wherein the component (A) is one or more selected from the group consisting of an alcohol, a phenol, an aldehyde, and an ether.

13. The fragrance composition according to claim 1, wherein the component (A) is one or more selected from the group consisting of phenethyl alcohol, eugenol, hexyl cinnamaldehyde, and estragole.

14. The fragrance composition according to claim 1, comprising the component (A) in an amount of 0.1 mass % or more and 2 mass % or less.

15. The fragrance composition according to claim 1, comprising the component (B) in an amount of 2 mass % or more and 7 mass % or less.

16. The fragrance composition according to claim 1, wherein the fragrance composition comprises a surfactant other than the component (B), and a proportion of the component (B) in all surfactants is 80 mass % or more.

17. The method for imparting a scent according to claim 5, wherein a proportion of the component (A) relative to 100 parts by mass of the component (B) in the fragrance composition is 10 parts by mass or more and 100 parts by mass or less.

18. The fragrance composition according to claim 1, wherein:

the component (A) is a fragrance having a Log P of 1 or more and 7 or less; and the component (B) is sodium di(2-propylheptyl)sulfosuccinate or sodium di(2-butyloctyl)sulfosuccinate.

19. The fragrance composition according to claim 18, wherein:

the component (A) is present in the fragrance composition in an amount of 0.1 to 2 mass %; and the component (B) is present in the fragrance composition in an amount of 2 to 6 mass %.

20. The fragrance composition according to claim 19, further comprising water having a hardness of 2° DH to 25° DH.

* * * * *